United States Patent [19]

Houston et al.

[11] 3,906,455

[45] Sept. 16, 1975

[54] ASSOCIATIVE MEMORY DEVICE

[75] Inventors: George B. Houston, Seattle; Roger H. Simonsen, Federal Way, both of Wash.

[73] Assignee: Boeing Computer Services, Inc., Seattle, Wash.

[22] Filed: Mar. 15, 1974

[21] Appl. No.: 451,634

[52] U.S. Cl. ........................ 340/172.5; 340/173 RC
[51] Int. Cl.[2] ........................................... G11C 15/00
[58] Field of Search.... 340/172.5, 173 RC, 173 AM

[56] References Cited

UNITED STATES PATENTS

| | | | |
|---|---|---|---|
| 3,733,589 | 5/1973 | Thompson | 340/173 AM |
| 3,742,460 | 6/1973 | Englund | 340/172.5 |

*Primary Examiner*—Terrell W. Fears
*Attorney, Agent, or Firm*—Donald A. Streck

[57] ABSTRACT

Apparatus for storing and associatively manipulating a large (10 × $10^6$ character) data base is disclosed. Said apparatus providing access control to devices constructed to operate in a block oriented random access manner and providing decision logic asynchronous to a digital computer connected to said apparatus to provide the location of stored data satisfying selected Boolean combinations of conditions and conjunctive operations over a designated portion of the total data base.

13 Claims, 13 Drawing Figures

SUBBGROUP PROCESSING ELEMENT (SPE) FUNCTIONAL FLOW

*TAG GENERATING LOGIC FOR 8 TRACKS (TYPICAL) ⟶

$$TAG_2 = T_2 = d_0$$

$$TAG_1 = T_1 = \bar{d}_0 \cdot C_0 + d_0 \cdot C_1$$

$$TAG_0 = T_0 = \bar{d}_0 (\bar{C}_0 \cdot b_0 + C_0 \cdot b_1) + d_0 (\bar{C}_1 \cdot b_2 + C_1 \cdot b_3)$$

ASSOCIATIVE MEMORY DEVICE

BACKGROUND OF THE INVENTION

1. Field of the Invention

Relates to peripheral memory devices for digital computers and more particularly to peripheral memory devices operating asynchronously to the digital computer and providing decision making logic.

2. Description of the Prior Art

Devices used by digital computers in the storage of data are subject to a time/cost tradeoff. Main storage has a rapid access time, but the cost per unit of data stored is high. Current data base sizes exceed $10^9$ characters and require effective and efficient use of mass memory. It would be prohibitive to consider the use of main storage for storing large volumes of data. What is desired, therefore, is an optimal marriage between the peripheral device with its low cost slow access and the central processing unit and main storage of the digital computer having high cost and very fast operation and access times.

Traditional rotating devices (e.g., discs and drums) provide low cost per unit of data but have a high access time due to the time required for mechanical motion of the recording components. Once data has been retrieved from such a mass storage device, the task of evaluation still remains. This task has been traditionally left to the software executing in the central processing unit.

Until the demands of contemporary systems became evident, the accepted approach to a problem of searching for a particular value on an area of mass memory was to transfer the data by address into main storage and compare the value contained therein to the test value until the entire relevant area had been searched or until a valid value was found.

Another accepted approach was to build software indexes to permit more convenient random access to the data on mass memory during the above-described search procedure. Sizeable update requirements due to data base volatility made the maintenance and operation of software indexes both complex and inefficient. This factor alone has inhibited the development of many new data base applications.

Thus, it is an object of the present invention to provide an associative mass storage device for large data bases with a low cost per unit storage area and a relatively fast access time.

It is yet another object of the present invention to provide an associative mass storage device for large data bases with the ability to make logic decisions relative to the contents of the data base entries asynchronous to the operation of the central processing unit and its operating software.

It is a further object of the present invention to provide an associative mass storage device for large data bases that can process the device in a minimum number of cycles.

It is still another object of the present invention to provide an associative mass storage device for large data bases that will provide conjunctive operations across a variety of fields.

It is another object of the present invention to provide an associative mass storage device for large data bases that will provide location data to the requesting software in order to allow handling of multiple entries in the data base satisfying the search criteria.

DESCRIPTION OF THE DRAWINGS

FIG. 8 including

FIG. 9 including

DESCRIPTION AND OPERATION OF THE INVENTION

Figure 1:
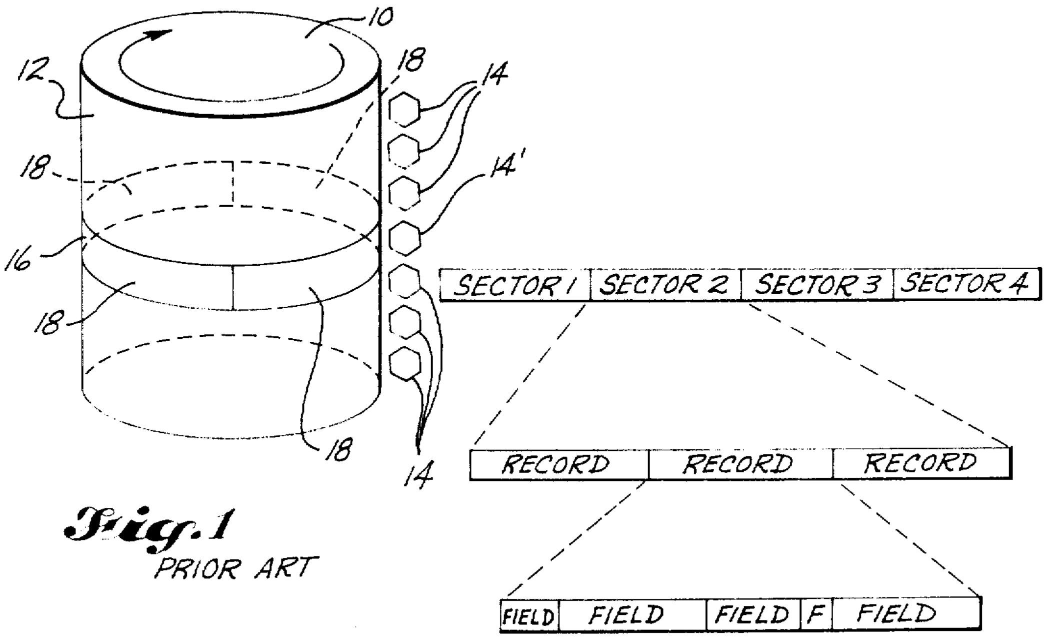
Fig. 1 PRIOR ART
FIG. 1 is a representation of a drum memory showing the designations of "track," "sector," "record," and "field."
Figures 2, 3:
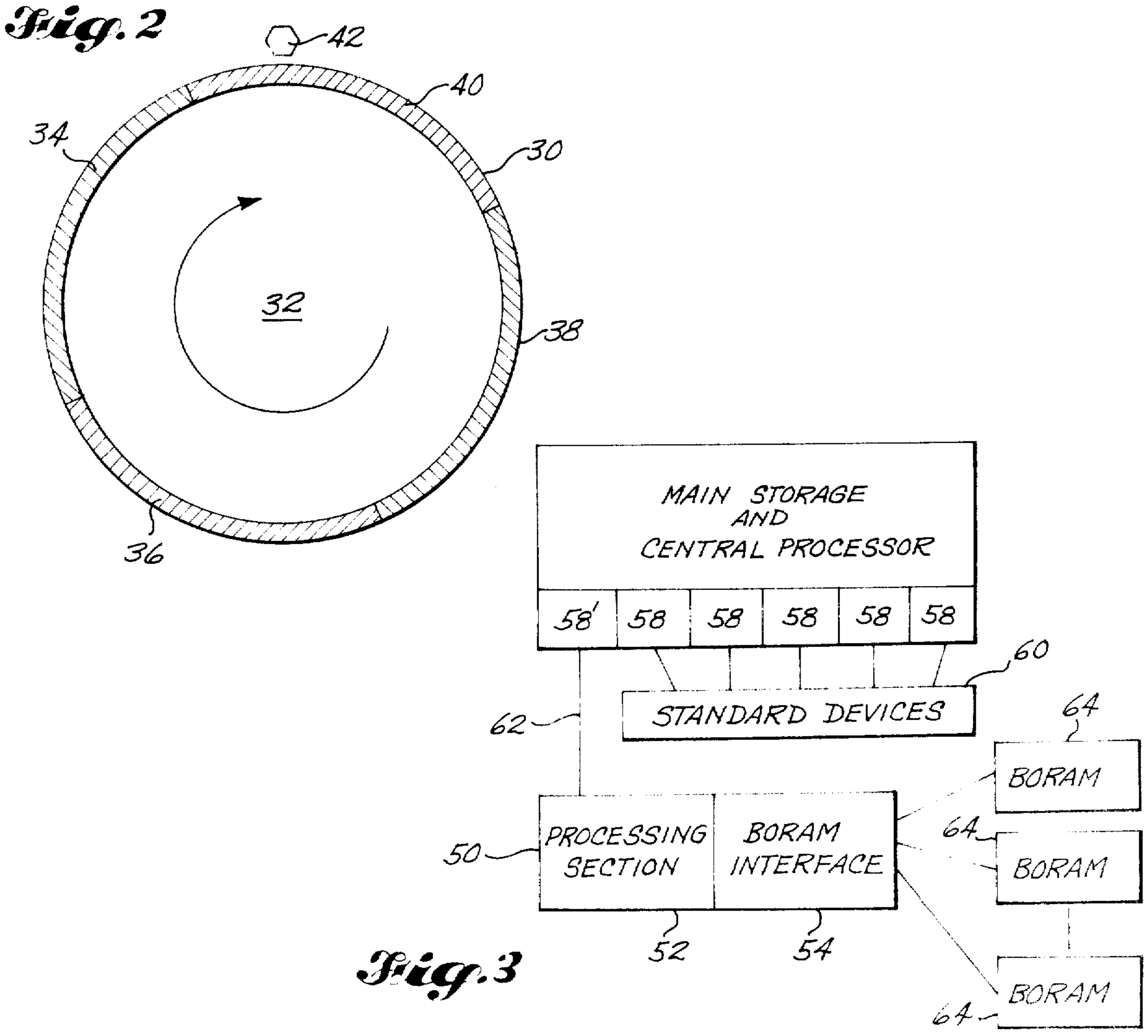
FIG. 2 shows the top view of the drum of FIG. 1.
FIG. 3 is a macro block diagram of the interface of the present invention to a digital computer.

Referring to FIG. 1, a typical prior art rotating device 10 is shown. The rotating device 10 has a surface 12 capable of being magnetized locally to a logical 1 or 0 state by heads 14 as the surface 12 passes the heads 14. Each head 14 is addressable individually. When a particular head 14' is addressed and given data to write on the surface 12 of the rotating device 10, the data is written on a band of the surface 12 about the circumference of the rotating device 10 known as a track 16. By means of a clock track (not shown) the circumference of the rotating device 10 and, therefore, each track 16 is divided into addressable portions called sectors 18. The device shown in FIG. 1 contains four sectors 18 in each track 16. The contents as would be readable from the track 16 by head 14' is shown in exploded fashion beside the device 10. A sector 18 is the smallest addressable area from the device 10. Thus we may read from track 16 (shown as typical of other tracks — not shown — existing beneath each head 14) by addressing head (track) 14' — sector 1, head 14' — sector 2, head 14' — sector 3, or head 14' — sector 4. Each sector 18 is often comprised of logical records (number of binary bits) 20 as defined by the requirements of the user and the characteristics of the device 10. Each record 20 is usually divided into fields 22 as defined by each using computer program. FIG. 2 shows the top view of one track 30 of a rotating device 32 as in FIG. 1 comprised of four sectors 34, 36, 38, and 40. The time for one sector 34, 36, 38, or 40 to be read by head 42 is called one sector time.

The present invention depends upon a storage device which is accurately described as a *Block Oriented Random Access Memory* or BORAM. For purposes of disclosing the present invention a BORAM implemented using LSI logic is characterized by:

a. a large collection of sequentially circulating data registers (typically 512 bits long);

b. a switching access time to any particular data register in the one microsecond range;

c. a latency access time to any particular data bit within a chosen data register in the one millisecond range;

d. a data transfer rate in the one megahertz range.

Currently, BORAMs are implementable using LSI semiconductor technology. Other technologies under development which could be used in a BORAM include magnetic bubbles and charge coupled devices. A BORAM could only be fashioned from the device of FIG. 1 if each track 16 had a head 14 for each sector 18. Thus, a mechanically rotating BORAM would not be as desirable as a BORAM implemented using LSI semiconductor technology wherein the rotation of data would be performed electronically, e.g., LSI registers rather than mechanically, providing reduced access times and much smaller physical packaging. For purposes of the present disclosure, however, the physical terminology of "track," "sector," "record," and "field" are well understood and will be used to provide a more easily understood point of reference for the description to follow hereinafter.

In any BORAM, the prime advantage is that not only can a sector be read or written in one sector time, but, additionally, it can be again read or written the next sector time which is not usually possible with rotating mechanical devices. The necessity for this attribute will become apparent in the further disclosure of the present invention.

Several data registers can be connected in parallel to give a byte-oriented device with the same characteristics.

In this specification the terminology used in reference to FIG. 1 is maintained even though the physical device of the implemented BORAM employs other terminology (e.g., registers).

The present invention is an associative storage device using one or more BORAMs as the mass data storage devices. An associative data storage device is one in which data is accessed by its value, a technique sometimes called content addressing. This type of access contrasts with conventional forms of storage device where data is accessed by explicit physical addresses on the device. More specifically, a data record can be retrieved from the device by just specifying the value of one field (or a boolean combination of fields) within the record. Further, the time required to retrieve this record is significantly shorter than can be achieved with conventional devices. An associative device implements in hardware much of the searching and housekeeping operations normally done in software.

To understand the construction of the associative storage device which is the subject of the present invention, we must first consider the algebra involved.

A general associative search, S, is composed of a sequence of N individual operations, each of the individual operations being applied to distinct fields of the logical records of the data base. Thus, if a record contains M fields, it follows that $N \leq M$.

Let $L = N-1$. The first L operations of the associative search S, are used to delimit a range of acceptable values on L distinct fields of the logical record: the range is specified using range operators, as shown in Table 1. The order in which the L range operations are applied is immaterial.

Table 1

| RANGE OPERATORS | VALUE OPERATORS | |
|---|---|---|
| > (greater than) | gs | (greatest) |
| ≥ (greater than or equal) | ls | (least) |
| ≤ (less than or equal) | = | (equality) |
| ≠ (not equal) | | |

The last operation in an associative search is a value operator (see Table 1). The value operation is usually applied to a field distinct from any of those involved in the first L range operators. The value operation serves to select one particular logical record in the data base, or, possibly, a set of records with the same value in the field used for the associative search. (The situation where several records have the same field value in the value operation is called a multiple-hit and is dealt with later.) The value operation must be applied after all range operations are complete (range and value operations do not commute). The value operation may also include a range operation on the field.

Referring now to FIG. 3, an associative controller 50 consisting of a processing section 52 and a BORAM sector 54 is shown as it would be connected to a standard digital computer 56. The computer 56 is equipped with selector channels 58 which can connect with various peripheral devices 60. One channel 58' or more would be connected to the associative controller 50 as its device. In some installations, it could be more advantageous for a particular application to have more than one associative device 50 on a selector channel 58'. Commands from the computer 56 to the associative controller 50 would pass out through selector channel 58' over cable 62 to the processing section 52 of associative controller 50.

Likewise, data control information and interrupts would be sent from the processing section 52 of associative controller 50 to selector channel 58' over cable 62. Communications and logic operations would be performed by the processing section 52 of associative controller 50. The BORAM interface 54 of associative controller 50 would handle the communications to and from the BORAMs 64 attached to the associative controller 50.

Figures 4, 6, 7:
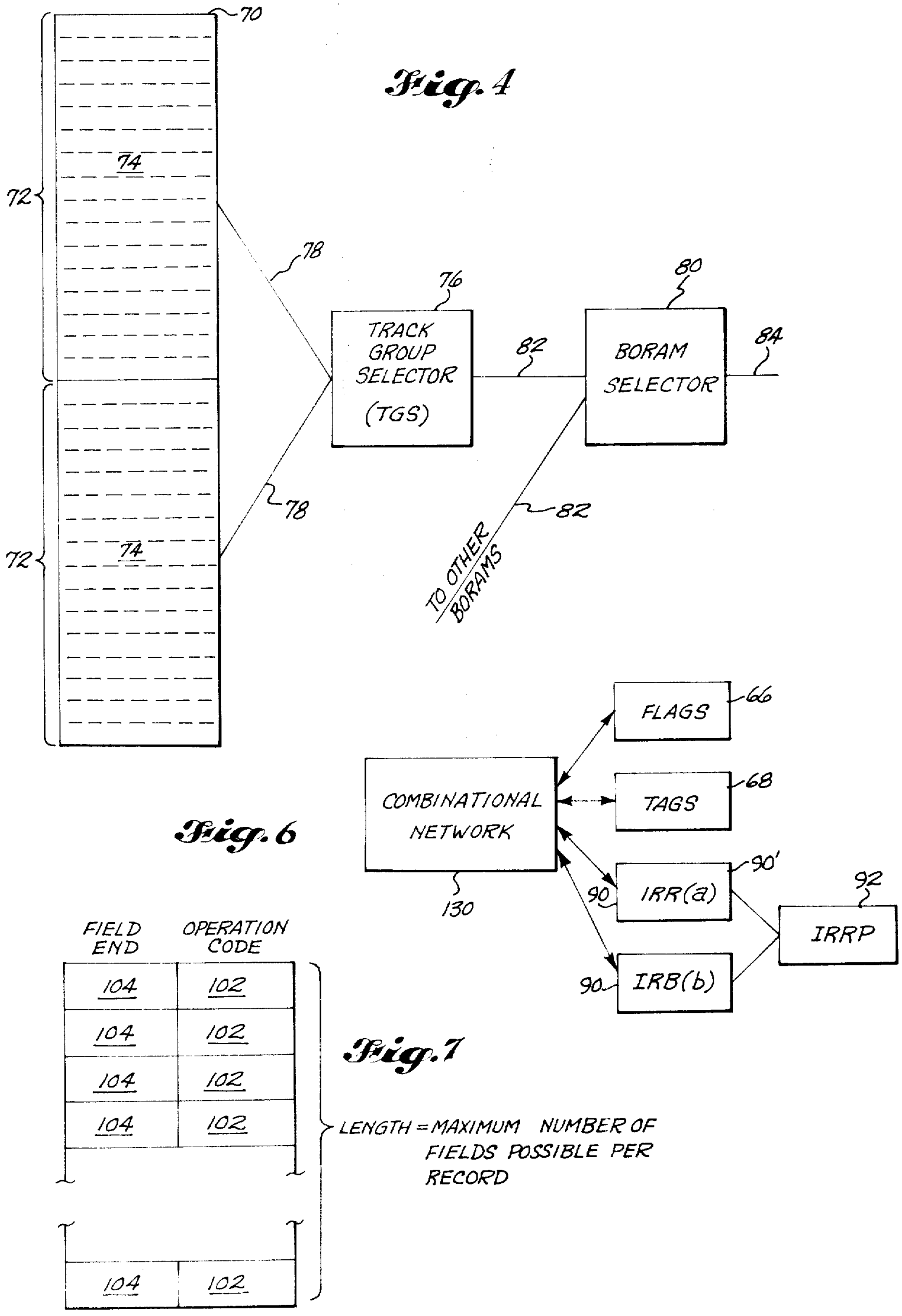
FIG. 4 is a macro block diagram of the interface of the present invention to a BORAM.
FIG. 6 is a macro block diagram of the elements of a subgroup processing element (SPE) of the present invention.
FIG. 7 shows the elements of the field control array (FCA) of the present invention.

FIG. 4 shows the division of a BORAM 70 into two track groups 72. It is anticipated that in a typical BORAM (such as that of FIG. 4 containing thirty-two tracks 74) it will not be technically practical to have the logic, to be hereinafter described, for reading and decision making for all tracks 74 in parallel. Rather, the tracks 74 will be grouped into track groups 72 as shown in FIG. 4. The number of tracks 74 in a track group 72 will partially determine the number of simultaneous parallel operations (and, therefore, the sets of logic to operate in parallel) that will occur. In other words, all the tracks 74 in one track group 72 will be processed and then all the tracks 74 in the next track group 72, and so on until all track groups 72 have been processed.

Each track group 72 is selectable by a track group selector (TGS) 76 through track group cables 78. The BORAM 70 of FIG. 4 is selectable by a BORAM selector 80 through BORAM cables 82 as are other BORAMs (not shown). Data then moves in and out over one selected track group cable 78, one selected BORAM cable 82, and the data cable 84.

Figure 5:
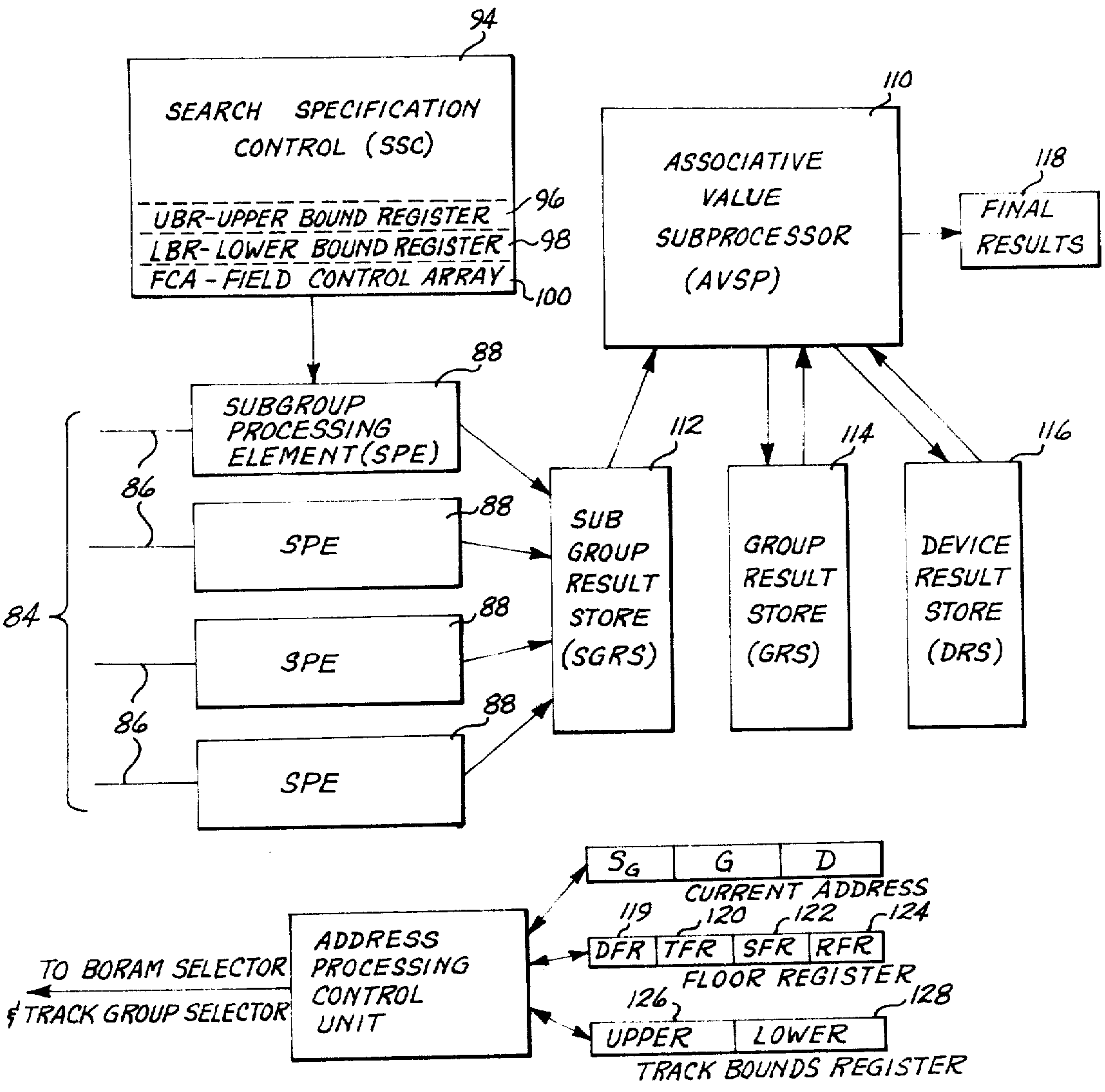
FIG. 5 is a macro block diagram of the logic elements and storage elements of the present invention.

FIG. 5 depicts the interface, logic groups, and storage required for a track grouping of sixteen tracks per track group as shown in FIG. 4. FIG. 5 illustrates sixteen track parallel operation. The size of the parallel operations to be allowable fixes the size of the subgroups to be manipulated in the description to follow. Both the track groups and subgroups are arbitrary groupings to be dictated primarily by cost limitations placed on the hardware to be built. If better performance (at somewhat higher cost) is desired, for example, the BORAM 70 of FIG. 4 could be designed with a single thirty-two track track group, broken down into eight track subgroups. Such a design would process thirty-two tracks in parallel. In addition, in such a design, the function of the track group selector (TGS) 76 would merge into that of the BORAM selector 80 since selection of a BORAM would dictate the track group to be accessed.

Referring to FIG. 5, four subgroup cables 85 are provided in data cable 84. Each subgroup cable 86 contains four track cables (not shown) — one track cable for each track 74 of the subgroup. The size of a subgroup is determined by the number of Subgroup Processing Elements (SPE) 88 provided and the number of tracks 74 in a track group 72. Since the BORAM of FIG. 4 contains sixteen tracks 74 in a track group 72 and four SPE's 88 have been provided, there are 16/4 = 4 tracks 74 in each subgroup. When a particular subgroup is read, the data from the four tracks 74 proceeds through a track group cable 78 chosen by the Track Group Selector 76, through a BORAM cable 82 chosen by the BORAM Selector 80 to the data cable 84 where it proceeds down one subgroup cable 86 to be processed by one SPE 88.

Each Subgroup Processing Element (SPE) 88 is configured as shown in FIG. 6. Each SPE 88 has a pair of intermediate results registers (IRR) 90 designated IRR (a) 90′ and IRR (b) 90″. Before value processing begins on a sector, IRR (a) 90′ contains the best possible value from previous sectors. IRR (a) 90′ is initialized to an appropriate value prior to processing the first sector of a search. As the best value is produced, it is fed into IRR (b) 90″. Simultaneously, the new value is compared to the current contents of IRR (a) 90′. If the new value in IRR (b) 90″ is more extreme (greater or less as required by the test being made) than the old value in IRR (a) 90′, a pointer to IRR (a) 90′ contained in the current intermediate results register pointer (IRRP) 92 is modified to point to IRR (b) 90″ (which now contains the best value to date). Processing on the next sector would then interchange the functions of IRR (a) 90′ and IRR (b) 90″ since IRR (b) 90″ would now contain the best value and IRR (a) 90′ would receive the new value. If IRR (a) 90′ contained the best value in the previously described operation, the contents of IRRP 92 would not be changed and the functions of IRR (a) 90′ and IRR (b) 90″ would remain the same. The processing to be accomplished during a search is governed by a search specification control (SSC) 94 initialized from data supplied by the requesting interfacing software. The SSC 94 is a collection of registers globally available to all the SPE's 78. The SSC 94 includes:

a. an upper bound register (UBR) 96
b. a lower bound register (LBR) 98
c. a field control array (FCA) 100

The two bound registers, UBR 96 and LBR 98, are preset with data values that are used in conjunction with range operators. The LBR 98 establishes the low value of the range and the UBR 96 establishes the high value of the range for each field 22 of the stored records 20. If a record 20 is to be selected successfully, the values in each of its fields 22 must be within the corresponding range defined by the bound registers 96 and 98.

The FCA 100 serves two functions:

a. it defines the fields 22 within the logical records 20;
b. it allows specification of the operation to be performed within each field 22.

The format of the FCA 100 is shown in FIG. 7. The operation code 102 consists of the four control designators shown in Table 2. The FCA 100 of FIG. 7 and Table 2 assumes an eight bit field for the operation code 102 and an eight bit field for the field end 104. The number of bits for the field end 104 must be sufficient to designate the bit number of the last bit in the record 20. The operation code 102 must allow two special designators (e.g. 00 and FF) to designate the "IGNORE" and "TERMINATE LOGICAL RECORD" states in addition to the combined operations of Table 2.

Table 2

| LBR OP | | VALUE OP | |
|---|---|---|---|
| = | 00 | None | 00 |
| > | 01 | Greatest | 01 |
| | 10 | Least | 10 |
| | 11 | Result Field | 11 |
| **UBR OP** | | **CONJUNCTION OP** | |
| = | 00 | LBR | 00 |
| > | 01 | UBR | 01 |
| | 10 | LBR∧UBR | 10 |
| | 11 | LBR∨UBR | 11 |

The LBR 98 op-codes allow equality, inequality, and minimum-value specifications; UBR 96 op-codes allow equality, inequality and maximum-value specifications.

A conjunction operator designator specifies whether the LBR 98 operation, or the UBR 96 operation, or both, is to be used in the search. The LBR 98 operation and UBR 96 operation can be joined conjunctively or disjunctively (effectively allowing inclusive or exclusive ranges). The designator can be used to set up an equality search by specifying just one bound register 96 or 98.

The value operation control designator should only be applied to one field 22 in a logical record 20. The designator allows selection of a search for the greatest or least value in a field 22.

The LBR 98 and UBR 96 will have a maximum length equal to the number of bits per sector 18 although in practice can be somewhat less than this. It must, however, be equal in length to the maximum length of a logical record 20 in a sector 18.

The requirement for an extremum search (i.e., greatest or least) on an arbitrary field 22 of a logical record 20 results in the requirement for two-pass processing over each sector 18, and hence in the need for a BORAM as opposed to a mechanical drum.

Pass 1

During the first pass on a specific sector 18, all the range operations specified are performed. At the end of each logical record 20, a flag bit 106 (See FIG. 6)

is set according to the Boolean value of the success of the range operation.

Pass 2

The sector 18 is then immediately reprocessed. Any logical record 20 which has not survived the range test (as indicated by the Pass 1 flag bit 106) is ignored. Otherwise the value operation specified in the operation code 102 is performed.

The value operation is performed in parallel on all tracks 34 within a subgroup each composed of (e.g.) 16 tracks 34. This requires an (e.g.) 4 levels cascade network — which is purely combinatorial. The output of the cascade network is a set of tag bits 108 (FIG. 6), which serve to address the specific logical record 20 within the subgroup 77 containing the extreme (i.e., largest or smallest) field 22.

Referring once again to FIG. 5, we have now established the functional relationships between the subgroup processing elements (SPE's) 88 and the search specification control (SSC) 94. The final major element for consideration is the associative value subprocessor (AVSP) 110. The AVSP 110 is effectively a conventional associative processor operating on small amounts of data. For one pass over a subgroup by a SPE's 88, a result is placed in the subgroup results store (SGRS) 112. When all the subgroups of a track group 72 have been processed, the AVSP 110 is actuated, and produces a single result, which is stored in the group result store (GRS) 114. The contents of the SGRS 112 are logically cleared at the end of the process, and will be overwritten by results obtained during processing of the next subgroup. When all track groups 72 of a device have been processed, the AVSP 110 is again called, combining all the group results into a device result stored in the device results store (DRS) 116. Finally, as the last search operation, the device results are combined, giving a final result 118. The AVSP 110 can be implemented as a sequential processor with little overall speed degradation.

The result of a value search is the identification of one record 20 satisfying the associative search criterion. It may be that there are several such records 20: to retrieve them we must use a subsequent equality search for each one. Of course, the equality search is also a valid associative search in its own right which may often be required. The basic problem in equality searching is the resolution of multiple hits: the remainder of this specification is concerned with a mechanism to handle the difficulty.

The exact way in which information is to be delivered to the mainframe has not been rigidly defined: however, for the moment we shall assume that the host mainframe can usefully handle only one record 20 at any one time satisfying an equality search. Thus, the associative device disclosed has provision for returning records 20 one at a time to the mainframe: the records 20 will be returned by increasing track-sector-record address. (Theoretically, one can consider each record's 20 unique address as an additional field 22 with which an additional associative operation is specified which logically eliminates multiple hits).

To implement this capability, four additional floor registers are included:

1. device floor register (DFR) 119;
2. track floor register (TFR) 120;
3. sector floor register (SFR) 122;
4. record floor register (RFR) 124.

These registers 119, 120, 122, and 124 specify a minimum record address which is acceptable in a search operation. On the initial search, they are all set to zero: when a record 20 is returned on an equality search, its address is incremented by one and stored into the floor registers 119, 120, 122 and 124. This data is made available to the requesting software. A suitable subsequent mainframe I/O command will restart the search operation using the same search values. The previously returned record 20 will thus be ignored. without the return of this data to the requesting software the handling of multiple hits is impossible. Some additional logic is required to assist this feature. Any track 74 with an address less than the TFR 120 will fail all search tests; any track 74 with an address larger will behave normally. The track 74 equal to the TFR 120 will have to make an explicit test, and change its behavior at the appropriate time.

In addition, a pair of track bound registers (TRB's) 126 and 128 will allow searches to proceed over only a continuous subset of the BORAM. This will allow the BORAM to hold more than one distinct data set (or index files, etc.).

Figure 8A:
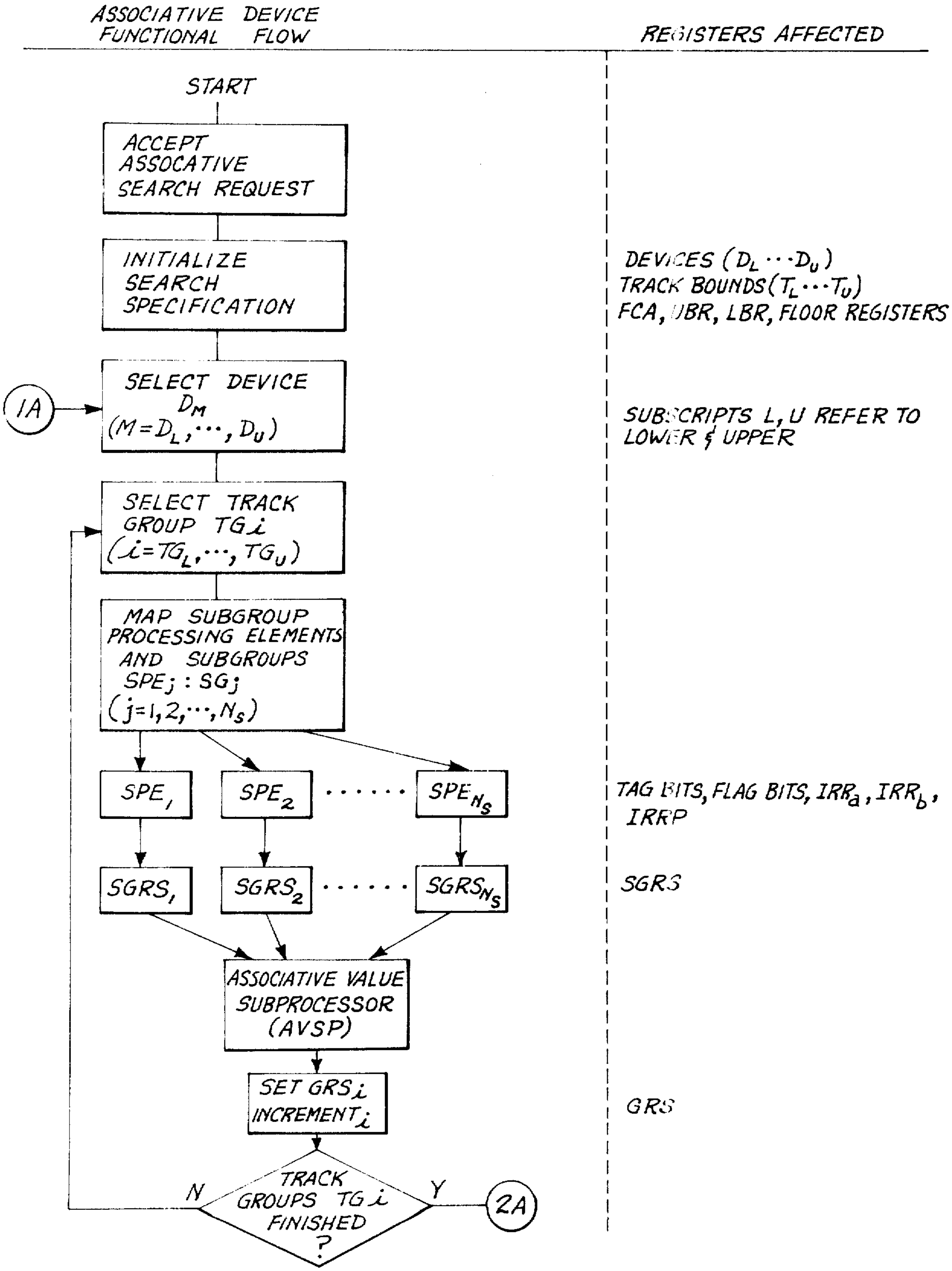
FIGS. 8A and 8B is a macro flowchart of the associative device logic.
Figure 8B:
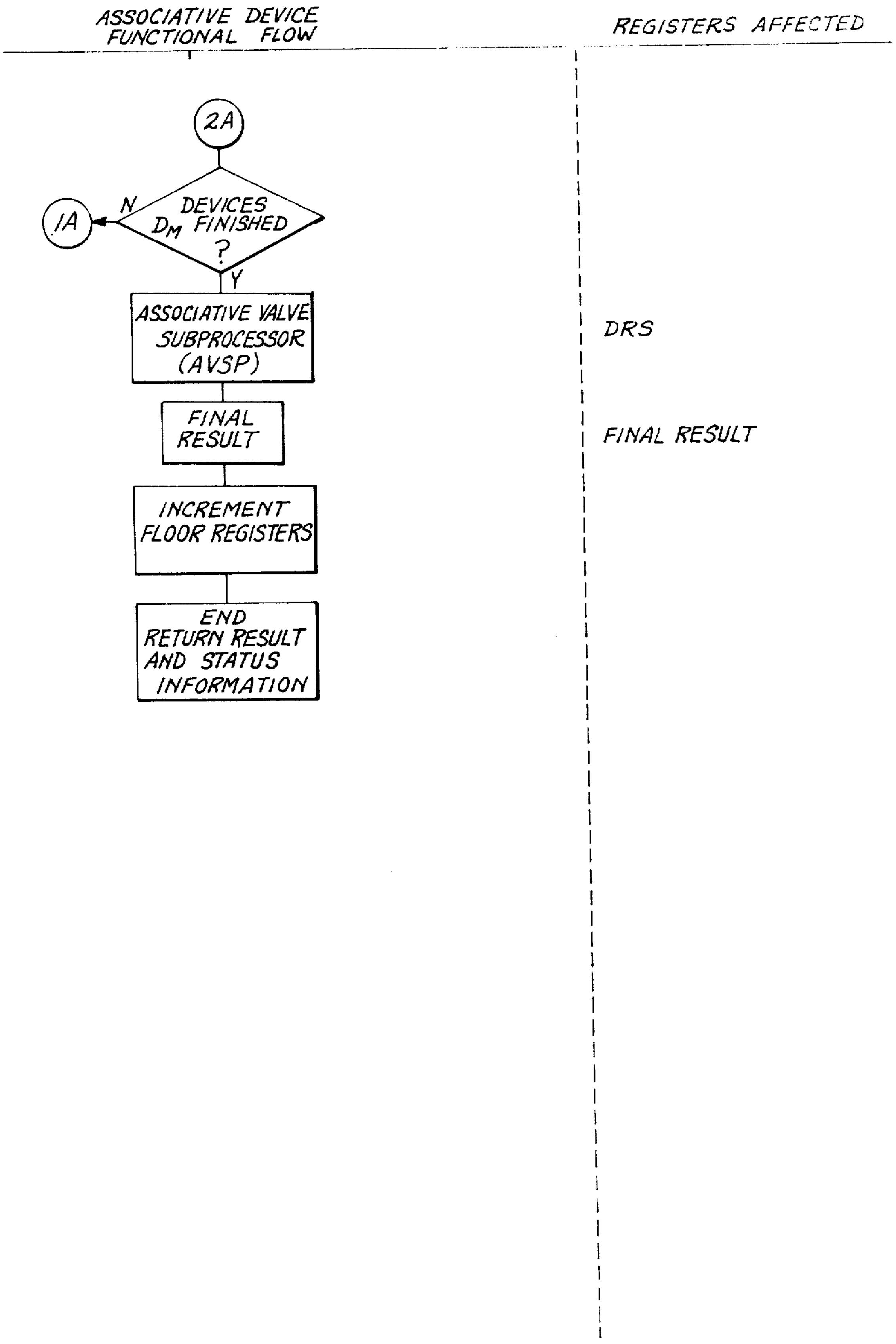
Figure 9A:
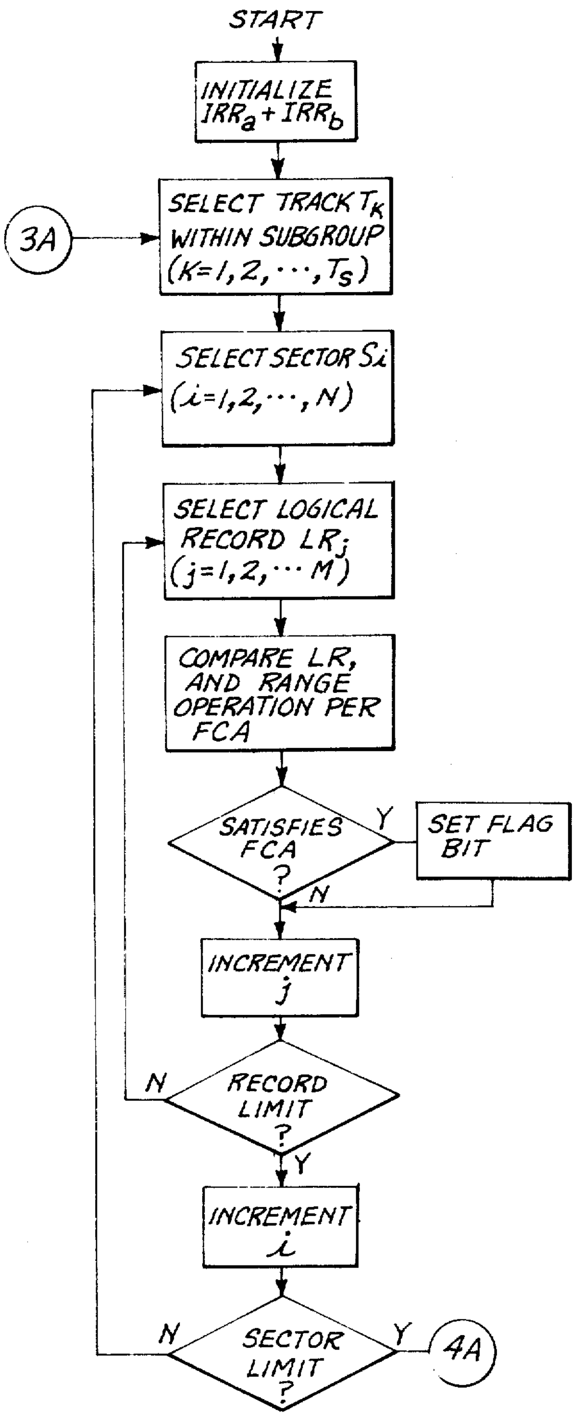
FIGS. 9A and 9B is a macro flowchart of the Subgroup Processing Element (SPE) logic.
Figure 9B:
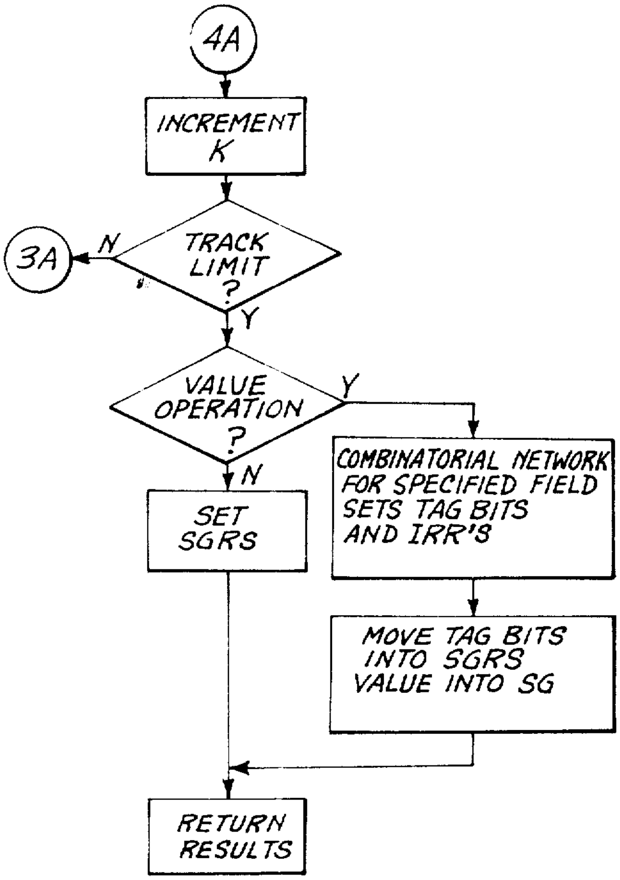

The logic to be implemented to practice the present invention is shown in FIGS. 8, 9, 10*a*, and 10*b*. FIG. 8 shows an overall macro flowchart of the required logic. FIG. 9 is a more detailed flowchart of the logic required to implement the Subgroup Processing Element (SPE) blocks of the flowchart of FIG. 8.

Figure 10A:
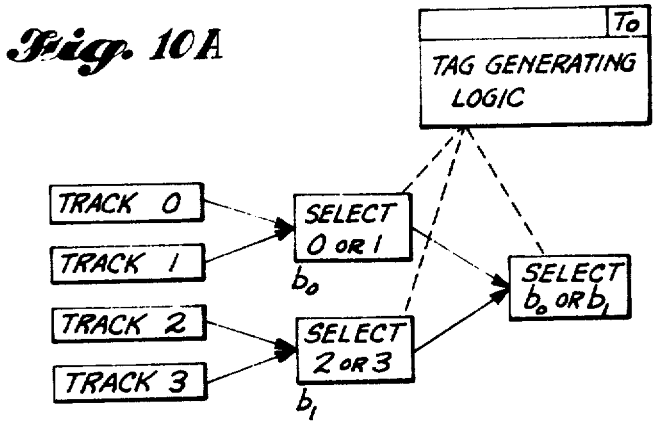
FIG. 10*a* is a two-level cascade combinatorial network.
Figure 10B:
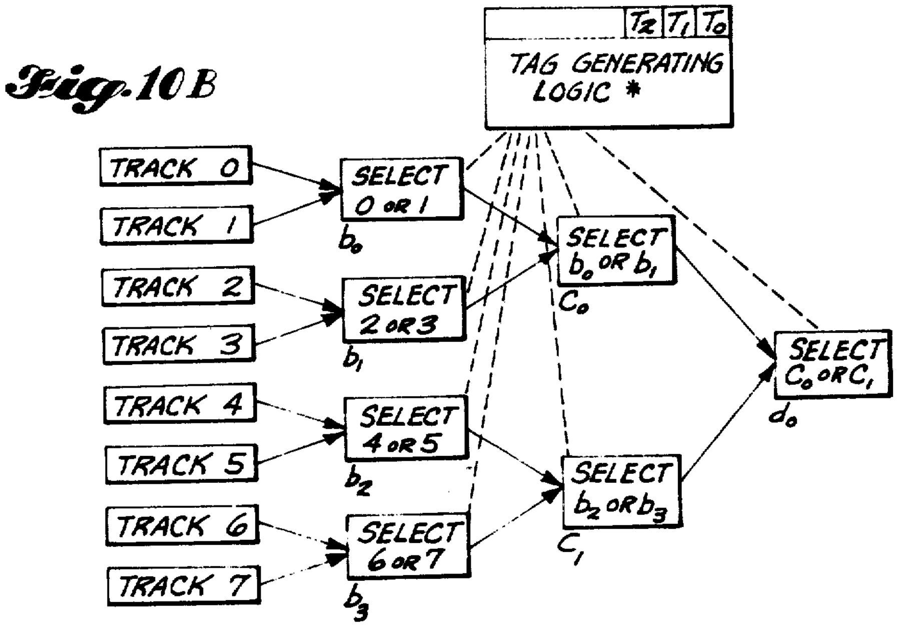
FIG. 10*b* is a three-level cascade combinatorial network.

FIG. 10*a* and FIG. 10*b* show the type logic required of the combinatorial network 130 of the flowchart of FIG. 9. What is disclosed is a cascade network of as many levels as represents the power of two number of tracks to be queried in parallel. Thus, in FIG. 10*a*, there are four tracks or $2^2$ tracks and two cascade levels are required. In FIG. 10*b*, eight tracks is $2^3$ so three levels are required to select the one track which meets the selection criteria. Selection criteria is determined by the operations specified in the Field Control Array (FCA) 100. The actual selection is performed by logic which processes one bit at a time from each of two inputs and chooses the appropriate one according to well defined prior art techniques. As each cascade level makes the appropriate selection, the corresponding tags 68 are set according to the sample logic equations shown in FIG. 10*b*.

The final result of the combinatorial network 130 is then compared with the current contents of the IRR 90 specified by the contents of the IRRP 92 using the same one bit at a time logic. After the final selection has been made, the tags 68 indicate the one track 74 selected (e.g., "largest," "smallest").

Having thus described our invention, we claim:

1. An associative memory device comprising:

a. a data storage device wherein;

1. data is stored and retrieved in predefined data blocks of equal numbers of bits;
2. the data in said data blocks is maintained in a constantly circulating state;
3. means are provided for reading said data blocks from said storage device and for writing said data blocks to said storage device;
4. said data in said data blocks is read from said storage device and written to said storage as the circulating data passes said means for reading and writing said data blocks;

5. said data blocks are comprised of data subblocks of equal numbers of bits;
6. said data sub-blocks are divided into data fields as defined by each individual request to the associative memory device.

b. a data storage device acquisition logic segment wherein;
1. said data blocks are addressed by data block groups, each data block group containing at least one data block;
2. said data block groups are comprised of data block subgroups containing equal numbers of data blocks;
3. means for parallel data transfer are provided to transfer data from said data storage device in parallel in units of data block subgroups, and c. a data processing logic segment wherein;
1. a subgroup processing element is provided for each data block subgroup contained in a data block group, each subgroup processing element containing means for receiving and storing the data in one data block subgroup being transferred in parallel from said data storage device by said data storage device acquisition logic segment;
2. a search specification control logic segment is provided, said search specification control logic being accessible by the computer program accessing said associative memory device to preset the limits of data search, the definition of said data fields, and the search success criteria for the duration of each access where access is the time from a request for an associative search by a computer program to said associative memory device until said associative memory device returns the results of the search to the requesting computer program;
3. logic is provided to combine the data in said subgroup processing elements and said search specification control logic to arrive at a best value from each data block subgroup and then combine said best values from the data block subgroups to arrive at a best value for the data block group;
4. logic is provided to cause said data storage device acquisition logic to transfer additional data block groups within the limits specified by said search specification control logic and to combine the best values for data block groups into a device result.

2. An associative memory device as claimed in claim 1 wherein:

a. the time for one of said data blocks to circulate past said means for reading and writing said data blocks is one block time; and, b. said circulating data blocks and said means for reading and writing said data blocks are so related that any of said data blocks can be read or written in one block time and then immediately read or written in the next block time.

3. An associative memory device as claimed in claim 1 wherein said data storage device is comprised of a plurality of circulating registers.

4. An associative memory device as claimed in claim 1 wherein, additionally:

a. logic is provided in said data storage device acquisition logic segment to allow searching over more than one of said data storage devices; and b. logic is provided in said data processing logic segment to combine said device results for each of said data storage devices into one final search result.

5. An associative memory device as claimed in claim 1 wherein said data processing logic segment contains a combinatorial network wherein:

a. said combinatorial network compares data within said data subgroups on a one bit at a time basis extracting those of said data fields as indicated by said search specification control logic; and, b. said comparison of said data fields is based on Boolean criteria also indicated by said search specification control logic.

6. An associative memory device as claimed in claim 1 wherein:

said best value is determined on the basis of said data fields of said data sub-blocks meeting individual and conjunctive Boolean criteria input to said associative memory device as said device is accessed, said best value being the data sub-block that best meets said Boolean criteria.

7. An associative memory device as claimed in claim 1 wherein:

said best value is determined on the basis of said data fields of said data sub-blocks meeting individual and conjunctive Boolean criteria input to said associative memory device as said device is accessed, said best value being the data sub-block that first meets said Boolean criteria.

8. An associative memory device as claimed in claim 1 wherein, additionally:

logic is provided to limit the search for said best value to a portion of said data storage device as specified by criteria input to said associative memory device as said device is accessed.

9. An associative memory device as claimed in claim 7 wherein:

the location of said best value which first meets said Boolean criteria is returned along with said device result.

10. An associative memory device comprising:

a. a circulating data storage device, said storage device being characterized by maintaining data contained therein in records comprising a preselected fixed number of bits, said data contained therein being addressable by sectors comprising a preselected fixed number of records, said data being further grouped into tracks comprising a preselected fixed number of sectors, track subgroups comprising a preselected fixed number of tracks, and track groups comprising a preselected fixed number of track subgroups;

b. means connected to said circulating data storage device for transferring said data contained therein from said circulating data storage device in a parallel mode in said track groups;

c. means connected to said means for transferring said data contained therein from said circulating data storage device in parallel mode in said track groups for selecting which of said track groups is to be transferred from said circulating data storage device;

d. means connected to said means for selecting which of said track groups is to be transferred from said circulating data storage device for receiving and storing said transferred track groups of data;

e. means responsive to said means for receiving and storing said transferred track groups of data for processing in parallel in track subgroups the data in each of said transferred track groups of data, said means for processing in parallel in track subgroups the data in each of said transferred track groups of data producing a best result for each track subgroup in each of said transferred track groups;

f. means cooperating with said means for processing in parallel in track subgroups the data in each of said transferred track groups of data for accepting the search criteria from the requesting computer program and for using said search criteria for specifying the area of said circulating data storage device to be searched and the criteria for selecting a best result, said best result being said record having said bits which best meet the search criteria provided by the requesting computer program when only one answer will meet said search criteria and which first meets said search criteria when more than one record can meet said criteria;

g. means responsive to said best result for each track subgroup for comparing said best result for each track subgroup and for producing a best result for each of said track groups;

h. means responsive to said best result for each track group for comparing said best result for each track group and for producing a best result for said circulating data storage device, and i. means responsive to said best result for said circulating data storage device for returning said best result for said circulating data storage device and the location of the record containing said best result for said circulating data storage device to the requesting computer program as a final results.

11. An associative memory device as claimed in claim 10 wherein, additionally, a. more than one circulating data storage device is provided, and b. means are provided responsive to said best results for each of said circulating data storage devices for comparing said best results and producing a single best results for all circulating data storage devices.

12. An associative memory device as claimed in claim 10 wherein:

a. said bits comprising said records are grouped into fields as defined by each requesting computer program, and b. said search criteria provided by each requesting computer program specifies which of said fields of each of said records are to be inspected and which of said fields of each of said records are to be ignored during the search for said best value.

13. An associative memory device as claimed in claim 12 wherein, additionally:

said search criteria provided by each requesting computer program specifies conjunctive operations across a variety of said fields of said records.

* * * * *

UNITED STATES PATENT AND TRADEMARK OFFICE

CERTIFICATE OF CORRECTION

PATENT NO. : 3,906,455

DATED : September 16, 1975

INVENTOR(S) : George B. Houston, Roger H. Simonsen

It is certified that error appears in the above-identified patent and that said Letters Patent are hereby corrected as shown below:

In the Drawing:

Fig. 8B, correct "VALVE" to read --VALUE--

In the Specification:

Column 5, line 18, "85" should read --86--

Column 6, lines 25 through 36, the left-hand column of "Table 2" should appear as follows:

| LBR | OP |
|---|---|
| = | 00 |
| > | 01 |
| ≥ | 10 |
| ≠ | 11 |

| UBR | OP |
|---|---|
| = | 00 |
| < | 01 |
| ≤ | 10 |
| ≠ | 11 |

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*